April 30, 1963 J. R. STEWART ET AL 3,087,998

RADIO TELEPHONE SYSTEM

Filed Jan. 17, 1958 4 Sheets-Sheet 1

INVENTORS
James Russell Stewart
BY Charles H. Willyard
Mueller & Aichele
Attys.

INVENTORS
James Russell Stewart
Charles H. Willyard
BY
Mueller & Aichele
Attys.

April 30, 1963 J. R. STEWART ET AL 3,087,998

RADIO TELEPHONE SYSTEM

Filed Jan. 17, 1958 4 Sheets-Sheet 3

INVENTORS
James Russell Stewart
Charles H. Willyard
BY Mueller & Aichele
Attys.

April 30, 1963 J. R. STEWART ET AL 3,087,998

RADIO TELEPHONE SYSTEM

Filed Jan. 17, 1958 4 Sheets-Sheet 4

INVENTORS
James Russell Stewart
Charles H. Willyard
BY Mueller & Aichele
Attys.

3,087,998

RADIO TELEPHONE SYSTEM

James Russell Stewart, Glen Ellyn, and Charles H. Willyard, Wheaton, Ill., assignors to Motorola, Inc., Chicago, Ill., a corporation of Illinois Filed Jan. 17, 1958, Ser. No. 709,560
12 Claims. (Cl. 179—41)

This invention relates generally to automatic radio telephone systems and more particularly to systems wherein scbscriber stations operating through a radio link can automatically dial other stations in the system and will be automatically selected by dialling from other stations.

Telephone systems have used radio links to permit telephone operation with mobile vehicles or with stations in a sparsely populated area where the cost of wire lines would be excessive. In such systems, it has been common practice to have a mobile operator who makes connections between the mobile stations and the telephone exchange. Although it has been proposed to provide automatic dialling equipment for use at stations connected to the telephone system by radio links, equipment available has been quite complex and has not been entirely satisfactory. In order to provide dial pulses and ringing signals over a radio link, it is necssary to convert these to signals which can be transmitted over a radio channel. In order for such systems to be economically practical the equipment at the mobile or other remote station must be quite simple and the equipment at the base or fixed station must not be unduly complex. Further, it is necessary that the equipment at the remote stations operates in generally the same manner as the usual dial telephone so that skill in operation is not required.

It is, therefore, an object of the present invention to provide an improved automatic telephone system for radio telephone use.

Another object of the invention is to provide a radio telephone system wherein ringing over a radio channel to a remote station and dialling therefrom to an automatic exchange is automatically provided by relatively simple equipment.

A further object of the invention is to provide a dialling system wherein tones are transmitted to represent the digits dialled and are then converted to dial pulses having the same characteristics as standard pulses produced by telephone subscriber stations.

Still another object of the invention is to provide an automatic radio connected telephone system wherein different ringing tones represent ringing on the different lines of the telephone circuit and produce interrupted ringing at the radio connected station in the same manner as at a standard telephone subscriber station.

A feature of the invention is the provision of a radio connected telephone system which may include mobile subscriber stations wherein ringing tones are automatically applied from the base station to the remote station on the same channel with communication signals, and dialling tones are automatically applied from the remote station to the base station with the communication signals, and in which the base station converts the tones to dialling pulses.

A further feature of the invention is the provision of a ringing system for a radio telephone system wherein the presence of intermittent ringing signals on a telephone line selectively actuates one of a plurality of oscillators, with the ringing signal modulating the tone of the oscillator to provide a signal suitable for transmission over the radio channel. The subscriber station selects the ringing tones and intermittently operates a buzzer as the intermittent modulated tone is received.

Another feature of the invention is the provision of a dialling system wherein four different tones are provided, with two of the four tones being selected to represent each digit of the number, and with a fifth tone being used as the third tone for each digit. At the base station, the tones are converted to voltages which set up the digit represented on a counter unit, and a pulser unit pulses the line in accordance with the number set up on the counter unit.

Still another feature of the invention is the provision of a telephone dialling system including a counting unit having a plurality of neon tubes connected in a chain and selectively ignited by voltages corresponding to the number dialled, and a pulsing unit including a plurality of neon tubes connected in a chain for operating a relay which interrupts the line to provide pulses. The neon tubes of the pulser operating in sequence in response to pulses of current pulse the line at a predetermined rate, and cause ignition of tubes of the counter along the chain in sequence until the end of the chain is reached, with the position of the tube originally ignited in the chain controlling the number of pulses applied.

In practicing the invention, there is provided an automatic telephone system wherein radio communication is provided from remote stations to a base station connected to a dial telephone exchange. The remote stations may be mobile stations or fixed stations. Tone signals which provide ringing operations are transmitted from the base station over a radio channel with voice signals. A ringing tones generator automatically provides different tones to identify ringing on different lines. These tones are transmitted to the remote station which has a ringing tone receiver for operating a buzzer. The tones are applied only when the ringing signal appears and, since the ringing signal is intermittent, the tone is also intermittent and produces intermittent operation of the buzzer. Dialling is provided from the remote station by tones transmitted to the base station. Signals representing various digits to be dialled are produced by selection of various combinations of two of four tones. An additional tone is added to the selected two tones for each digit. A combination of two of the four tones not used for any digit is transmitted to provide disconnect operation at the base station. The tones are selected by decoders at the base station which provide voltages to various terminals of a pulsing unit. A counter unit having a chain of neon tubes serves as a memory device with a particular tube being ignited when the decoder produces voltages corresponding to a particular digit. The pulsing unit includes a second neon tube chain, the tubes of which are ignited in sequence when a digit is dialled to pulse the line at a predetermined time interval. The pulser ignites the tubes of the counter unit along the chain to the end thereof at which point dialling stops. Accordingly, the number of dial pulses produced depends upon the position in the chain of the neon tube ignited by the voltages applied from the decoder. Fully automatic operation is produced so that ringing to the remote station and dialling therefrom are provided without the requirement for a mobile operator at the telephone exchange.

Figures 1, 4:
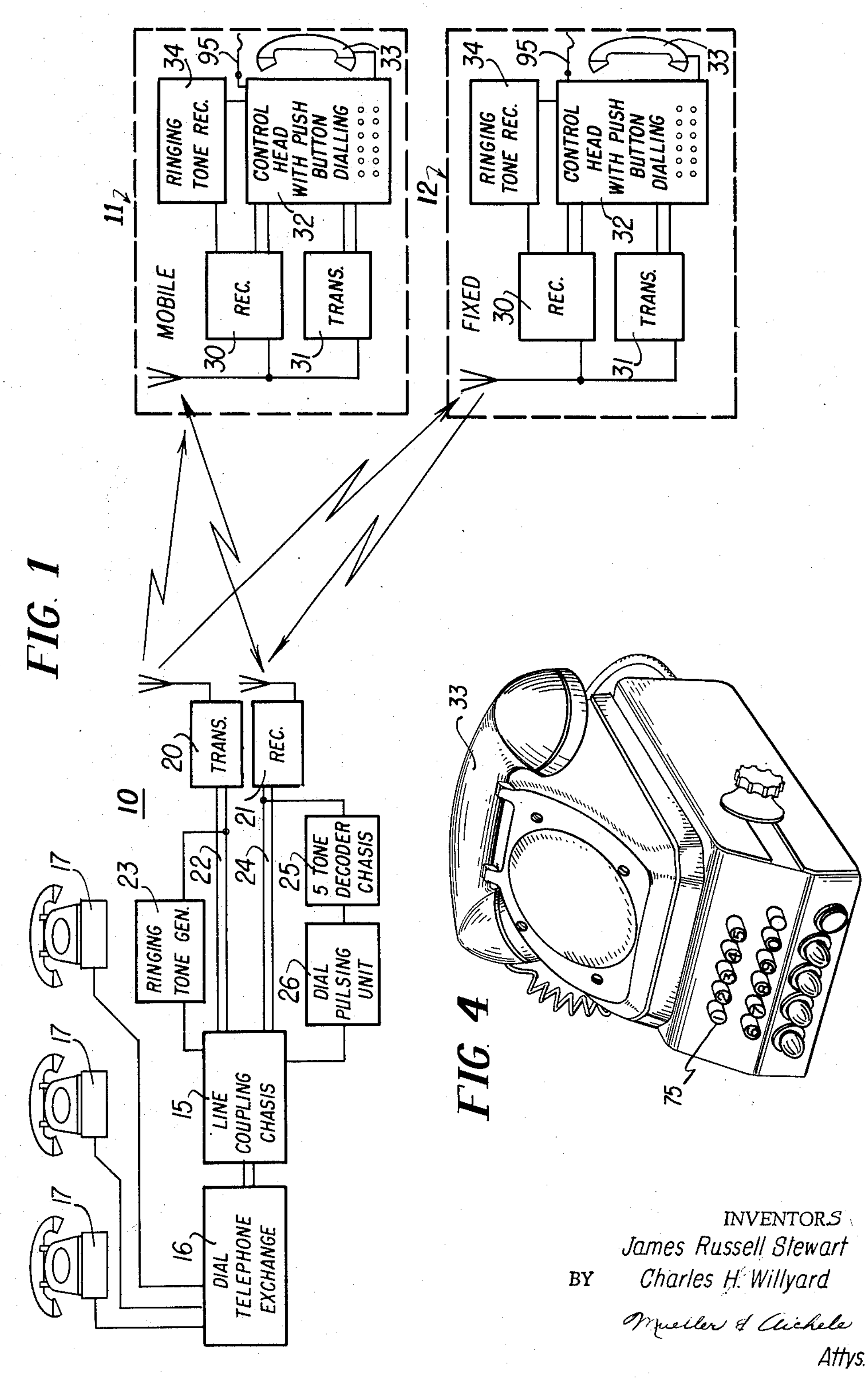
FIG. 1 is a block diagram of the automatic telephone system in accordance with the invention.
FIG. 4 is a perspective view of the remote subscriber station equipment.

Referring now to the drawings, in FIG 1 there is shown a telephone system including a terminal or base station 10 and remote or subscriber stations 11 and 12. Station 11 is shown as a mobile station and 12 as a fixed station.

It is to be pointed out that a plurality of mobile and/or fixed stations may be provided in the system. The terminal station 10 includes a line coupling chassis 15 which is connected as a party line to a dial telephone exchange 16. A plurality of subscriber stations 17 are also connected to the dial telephone exchange. The terminal station includes a radio transmitter 20 and a radio receiver 21. A pair of lines 22 provides signals from the line coupling chassis to the transmitter and the ringing tone generator 23 provides tones to be transmitted for selecting the individual subscriber station. Signals from the receiver 21 are appiled through line 24 to the line coupling chassis 15 and provide the communication channel. Signals from the receiver are also applied to the decoder chassis 25 which controls dial pulsing unit 26 which applies dialling pulses to the line coupling chassis for operation of the dial telephone exchange. Each of the remote stations includes a receiver 30 and a transmitter 31 which may be connected to the same antenna. The receiver applies signals to the control head 32 which are in turn applied to the receiver in the hand set 33. A ringing tone receiver 34 provides audible and/or visible signals when the station is called and this is controlled by signals received by the radio receiver 30. The control head 32 includes a push-button dialling system for applying tones to the transmitter 31 which are transmitted for controlling the decoder and pulsing unit at the terminal station.

*Ringing From Base Station*

Figure 2:
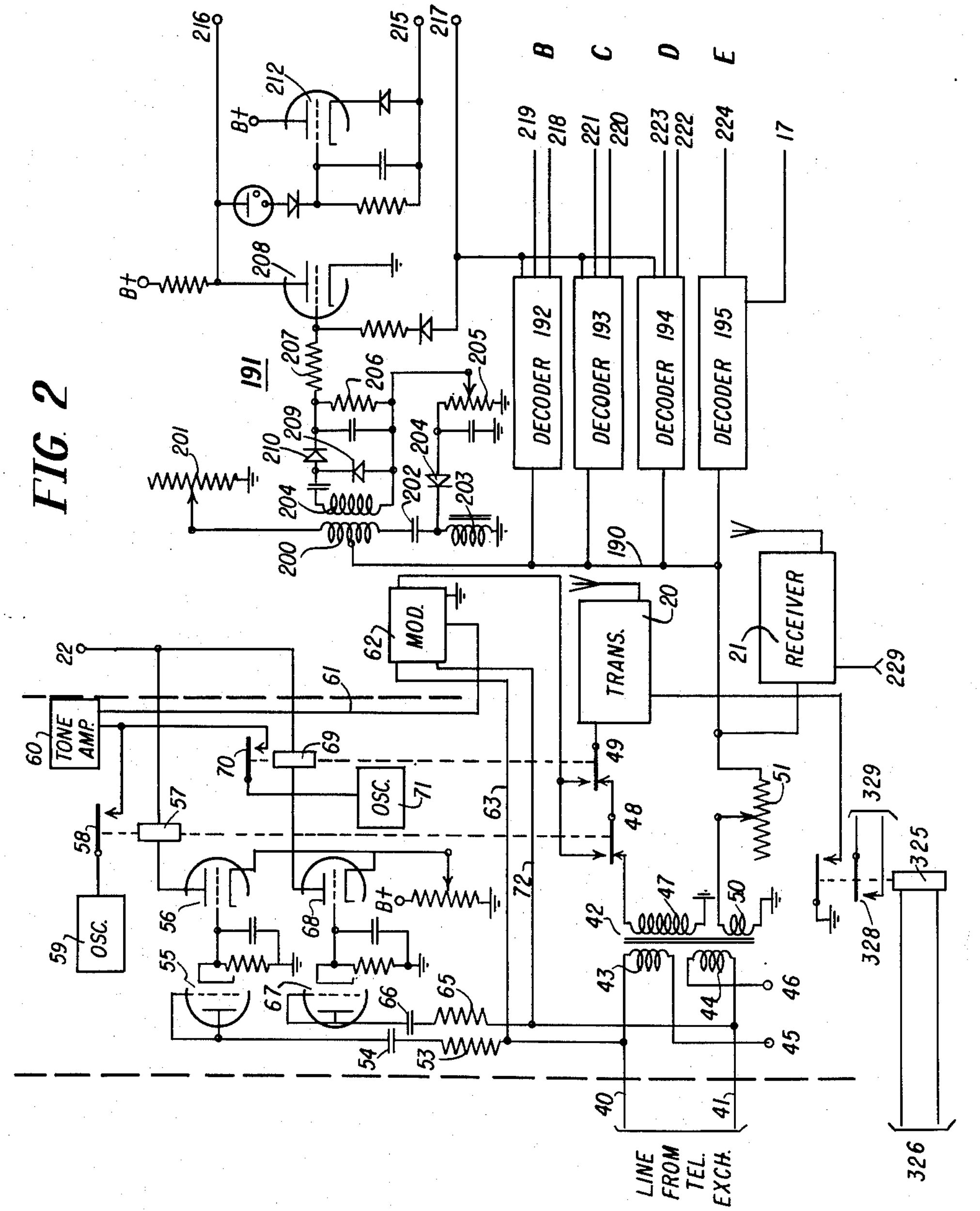
FIG. 2 illustrates the line coupling, ringing tone, and tone dialling sections at the base station.

Considering now more particularly the equipment at the terminal station, FIG. 2 shows the equipment of the line coupling chassis 15, the ringing tone generator 23, and the five-tone decoder chassis 25, with the coupling of these elements to the line from the telephone exchange and to the transmitter 20 and receiver 21. The lines from the exchange 40 and 41 are connected to a transformer 42 which has split windings 43 and 44 having outer terminals connected to the lines 40 and 41. The inner terminals of the windings, numbered 45 and 46, are selectively connected to provide signalling as will be fully set forth. The transformer 42 has a winding 47 which provides signals from the telephone line to the transmitter 20 through relay contacts 48 and 49. The transformer 42 also has a winding 50 to which signals from the receiver 21 are applied through variable resistor 51. Accordingly, signals from the line are applied through windings 43 and 44 to the winding 47 and from this winding to the transmitter, and received signals are applied from the winding 50 to the windings 43 and 44. Two-way communication is therefore provided through the transmitter to and from the telephone line.

As the ringing signals cannot be directly transmitted over the transmitter 20, ringing tone generator apparatus is required to provide a signal which can be so transmitted. The line 40 is connected though resistor 53 and condenser 54 to the triode section 55 which serves as a rectifier. The ringing signals on line 40, which are intermittently applied in standard telephone systems, are sensed by the rectifier 55 and render the triode section 56 conducting to actuate relay 57. The relay 57 closes contacts 58 to connect oscillator 59 to tone amplifier 60. The output of the tone amplifier 60 is applied through line 61 to the modulator 62. The ringing signals from the line 40 are also applied to the modulator through line 63. Ringing signals of a plurality of different low frequencies may be applied on each line and, to permit selection of each different signal at the remote station, the ringing signals on line 40 are modulated on the wave from the oscillator 59 in the modulator 62 to provide two sidebands equally spaced from the frequency of the oscillator by the frequency of the ringing signals. It will be noted that the contact 48 from the winding 47 to transmitter 20 is operated by the relay 57 and when this contact is moved in the upward position, the signal line from the transformer to the transmitter is broken and signals from the modulator 62 are applied to the transmitter. Accordingly, the modulated ringing wave is applied to the transmitter and transmitted to the remote station.

Similarly, line 41 is connected through resistor 65 and capacitor 66 to the triode section 67 which detects the presence of ringing signal on line 41. This operates the triode section 68 to actuate relay 69. This closes contact 70 to apply the waves from the oscillator 71 to the tone amplifier 60. These waves are applied through line 61 to the modulator 62 together with the ringing signals of one of a plurality of different frequencies from the line 41 and which are applied to line 72. The contact 49 in the line from the transformer 47 to the transmitter 20 is controlled by the relay 69 and opens the signal line and closes the line from the modulator 62 to the transmitter 20. Accordingly, when ringing signals appear on either line 40 or 41 from the exchange, a distinctive modulated ringing wave or tone is produced by the modulator 62 and applied to transmitter 20 for transmission to the remote stations.

Figure 3:
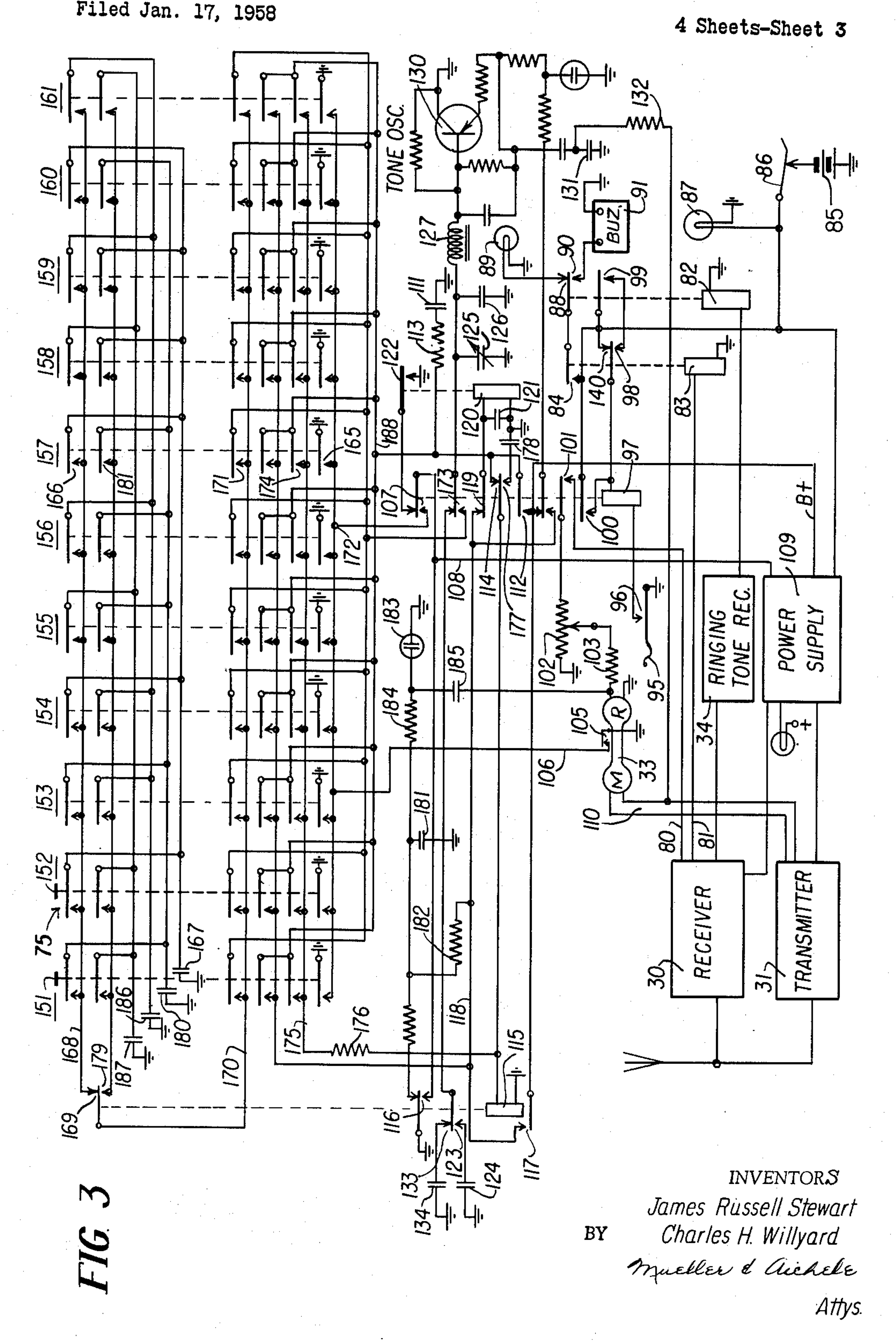
FIG. 3 illustrates the remote station equipment including the push button dialling system.

Considering now the equipment at a remote station, reference is made to FIGS. 3 and 4. FIG. 3 is a circuit diagram showing the equipment at the remote station, and FIG. 4 illustrates the push-button control box and the telephone set itself which may be used for remote fixed locations. The set includes a handset 33 as shown in FIG. 1 and the control box includes push-buttons 75 to provide dialling from the remote station. Signal lamps are also provided on the box as will be fully explained.

As shown in FIG. 3, the receiver 30 at the remote station applies signals to the ringing tone receiver 34, applies the voice signals to line 80, and applies a control voltage to line 81 when a signal is received. The signal applied on line 81 is called a squelch signal since it is operated by the squelch system of the receiver. This signal indicates the presence of a carrier wave in the receiver.

The remote receiver is energized by a positive potential from the source 85 through the main on-off switch 86. The pilot light 87 connected to source 85 will show when the remote receiver is turned on. When a remote station is being called, the voltage on line 81 from the receiver will operate squelch relay 83 as soon as a carrier is received. This will close contacts 84 which apply potential through normally closed contacts 88 to the pilot light 89 which shows that a signal is being received.

The first signal to be received will be the ringing wave or tone. This will be selected in the ringing tone receiver 34 and will control the ringing relay 82. The ringing tone receiver 34 includes frequency selective units responsive to the two sidebands of the transmitted modulated ringing signal, with the receivers at different remote stations responding to sidebands of different frequencies. The ringing wave transmitted by the transmitter will be an intermittent wave since this is produced only when the ringing signal is present on one of the telephone lines. This intermittent wave will control the relay 82 in an intermittent manner. When the ringing relay 82 is operated, the contacts 88 will break and contacts 90 will close to energize the buzzer 91. The buzzer will be operated in an intermittent manner as the relay 82 operates intermittently. This will produce then the same type of calling signal as in a normal telephone subscriber station.

When the buzzer sounds, the operator will remove the hand set 33 from the hook switch 95 and this will close contacts 96. The hook switch relay 97 will be energized through contacts 96 and the closed contacts 98 of the squelch relay 83 when the ringing relay 82 is energized and its contacts 99 are closed. The hook switch relay 97 is therefore energized by the first ringing tone after the hook switch is closed. When the relay 97 operates, it locks up through its own contacts 100 to remain operated as long as the hook switch is closed. The hook switch relay 97 also closes contacts 101 which apply signals from line 80 through potentiometer 102 and resistor 103 to the receiver of the hand set 33.

When the remote operator wishes to talk, a push-to-talk switch 105 on the hand set is closed to ground conductor 106. This ground is completed through contacts 107 of relay 97 and line 108 to the power supply 109. This operates the power supply to turn on the transmitter in a known manner. The microphone of the hand set 33 is normally connected to the transmitter through lines 110 so that when the transmitter is turned on, the mobile operator can transmit signals to the base or terminal station.

When the telephone conversation is completed, the mobile operator replaces the hand set 33 on the hook switch 95 to break contacts 96 and release the relay 97. While the relay 97 is closed, capacitor 111 is charged through contacts 112 from the B+ supply provided by the power supply 109. When the hook switch is released and the relay 97 drops out, capacitor 111 starts to discharge through resistor 113 and close contacts 114. This causes operation of the timing relay 115. Contacts 116 of relay 115 will close and apply ground to line 108 connected to the power supply so that power supply operates to turn on the transmitter. Operation of the timing relay 115 also closes contacts 117 to apply the B+ potential from the power supply to the line 118, which is connected to contacts 119 which are closed as relay 97 is deenergized. This energizes relay 120 and charges capacitor 121 connected across this relay. Contacts 122 of the relay 120 close to maintain a ground on the line 108 which causes the power supply to hold the transmitter on.

The timing relay 115, when energized, also closes contacts 123 to connect capacitor 124 parallel with capacitors 125 and 126 of the tone oscillator including transistor 130. These capacitors in parallel are connected in series with inductor 127 and form the frequency controlling circuit of the tone oscillator to provide tone C. The tone from the oscillator 130 is derived across capacitor 131 and applied through resistor 132 to the lines 110 connected to transmitter 31 so that the tone is transmitted over the air. After a time interval, capacitor 111 discharges to deenergize the timing relay 115. This causes contacts 123 to open and contacts 133 to close connecting capacitor 134 in parallel with capacitors 125 and 126. Accordingly, a second tone D is now applied to the transmitter. Although the coil of relay 120 is disconnected when relay 115 drops out, capacitor 121 has charged to hold the relay 120 operative for a short time. This permits the second disconnect tone to be transmitted. After the relay 120 drops out, contacts 122 open to remove the ground to the power supply so that the transmitter is turned off. The reception of tones C and D at the central station provides the disconnect function as will be described.

*Dialling From Mobile Station*

When the operator of the mobile station wishes to make a call, he removes the hand set 33 from the hook switch 95 as at the usual telephone subset (FIG. 3). This grounds the relay 97 which is energized through contacts 140 of the relay 83 which is deenergized. Relay 97 locks up through its own contacts 100 as previously described. With relay 97 energized, the operator closes the push-to-talk switch 105 and applies ground through the contacts 107 to the line 108 to the power supply 109. This causes the power supply to turn on the transmitter. The transmitter will seize the line and after the operator releases the push-to-talk button, he will hear the dial tone in the usual manner.

As shown in FIG. 4, the control box at the remote station includes push-buttons 75 which are used to provide the dialling function. Push-buttons are preferable to a dial because the mobile receiver may be subject to severe vibration which might render the dial inaccurate. Also, it is easier in a moving vehicle to operate a pushbutton than to actuate the dial. The push-buttons appear across the top of FIG. 3 and are numbered 151, 152, 153, 154, 155, 156, 157, 158, 159, and 160 to correspond to the digits 1 to 0 respectively. An eleventh button 161 is provided to provide disconnect operation for revertive calls between remote stations, as will be set out hereinafter.

For simplicity, we will assume that the number to be dialled includes three digits: 7—4—8. When the button 157 is pressed for digit 7, contacts 165 are closed to provide a ground through contacts 107 and line 108 to the power supply, and this turns the transmitter on. As will become more apparent, operation of each push-button sends out three tones in sequence. Push-button 157 closes contacts 166 to connect capacitor 167 to line 168. This connection is continued through contacts 169 of relay 115 to the line 170. This connection is continued through closed contacts 171 of push-button 157 to line 172 which is connected through contacts 173 of the closed relay 97 to the oscillator 130. Accordingly, capacitor 167 is connected in parallel with capacitors 125 and 126 to produce a tone which will be designated tone A. This tone is applied from capacitor 131 of the oscillator to the transmitter 31 and is transmitted.

As relay 97 is operated, B+ is applied through its contacts 112 to the line 188. This is continued through closed contacts 174 of the push-button 157 to line 175 connected through resistor 176 to the relay 115 and to capacitor 178 through closed contacts 177 of energized relay 97. After a time interval, capacitor 178 becomes charged and the B+ operates the relay 115 to break contacts 169 and close contacts 179. This completes the circuit from capacitor 180 through contacts 181 of push-button 157 to line 170, contacts 171, and line 172 to connect the capacitor 180 in parallel with capacitors 125 and 126. This provides a second and different tone which will be designated as tone B. This application of B+ through resistor 176 to the relay 115 is delayed because capacitor 178 is connected across the relay 115 by its contacts 177. Accordingly, the A tone will be transmitted until relay 115 operates and then the B tone will be transmitted.

When relay 115 operates, capacitor 181 charges through resistor 182 connected through contacts 117 to the B+ supply. When the capacitor 181 is charged, the lamp 183 is energized through resistor 184. Capacitor 185, resistor 184, and the lamp 183 form a network which produces an audible tone which is heard in the receiver of the hand set 33. Accordingly, the operator is advised by the lamp 183 and by the tone in his hand set that the tones have been transmitted and that he may release push-button 157 which provides digit 7. This removes the capacitor 180 from the oscillator and the oscillator produces a tone which results from the capacitors 125 and 126 without any additional capacity being applied. This tone is referred to as tone E. This is the last tone associated with the first digit to be transmitted. Although release of the push-button releases the energizing path to the relay 115, capacitor 178 is charged to hold the relay 115 operated for a short time interval. This is sufficient time to permit transmission of the E tone.

The other push-buttons operate in the same manner set forth above to provide other dialling digits. When push-button 154 is operated to provide digit 4, capacitor 167 is again first connected to provide the A tone. The second tone, however, is not the B tone but the C tone produced by connection of capacitor 186. The same E tone is provided by all digits. When push-button 158 is provided for digit 8, the first tone produced is the D tone provided by connection of capacitor 187. The second tone is the A tone produced by connection of capacitor 167. The third tone is again the E tone. The ten digits are produced by various combinations of two of the four tones A, B, C, and D produced by connection of the capacitors 167, 180, 186, and 187 respectively.

Each tone may be produced either as the first or second tone of the combination to provide a large number of combinations from a selection of two of the four tones.

The C and D tones are produced to provide the disconnect function as previously described. These are produced by operation of the hook switch 95 or by operation of the push-button 161. Capacitor 124 and capacitor 186 may have the same value so that connection of either one will provide the C tone. Similarly, capacitors 134 and 187 may have the same value so that either produces the D tone. These two tones are not used together in sequence of C and D for any of the digits.

*Operation At Base Station*

When the mobile station is dialling a number, tones from the mobile station are received at the base station by the receiver 21, FIG. 2. These are applied through line 190 to the tone decoders 191, 192, 193, 194, and 195. These decoders may be identical and only decoder 191 is shown in detail. The decoders are constructed to individually respond to one of the tones A, B, C, D, and E transmitted from the mobile station. The construction of the decoders is described and claimed in application Serial No. 267,887, now Patent No. 2,834,879, filed January 23, 1952.

Considering decoder 191, the signal from line 190 is applied to the center tap of the input transformer 200. One side of the winding is connected to ground through resistor 201 and the other side is connected to ground through the resonant circuit including capacitor 202 and inductor 203. When the signal to which decoder 191 responds is applied thereto, the current through the two halves of the winding 200 are equal and opposite so that no voltage is induced in the secondary winding 204. However, the current flowing through the series resonant circuit formed by capacitor 202 and inductor 203 is rectified by the diode 204 and appears across potentiometer 205 as a negative voltage which is applied through resistors 206 and 207 to the grid of the triode section 208. This will cut off tube 208 and cause a high positive voltage to be applied to terminal 216 for a marker or ionization voltage to the neon bulbs of the counter unit shown in FIG. 5. The function of the ionization voltage is explained later. The high positive voltage developed at the plate of tube 208 when it is cut off is fed to the grid of tube 212 which in turn conducts and causes current to flow to terminal 215 connected to relay 230 shown in FIG. 5 and whose function is also explained later. When a signal other than the frequency to which the decoder 191 responds is applied, the signal in the two halves of the winding 200 will not be equal and opposite and a voltage will be developed across the winding 204. This will be rectified and doubled by the rectifiers 209 and 210 to produce an opposing positive voltage across resistor 206. This will hold the tube 208 in conduction. However, when the frequency to which the system responds is received and there is no voltage across resistor 206, the negative voltage from potentiometer 205 will cut off the tube 208 and, in turn, cause tube 212 to conduct.

A plurality of outputs are provided from the decoder, with connection 215 being made from the cathode circuit of the triode 212 and the connection 216 from the anode of triode 208 providing a high voltage. A further connection 217 is common to the decoders 191, 192, 193 and 194 and provides a blocking voltage which will be further described. The decoders 192, 193, 194, and 195 for the tones B, C, D, and E as stated above are identical to the decoder 191. The decoder 192 has output terminals 218 and 219, the decoder 193 has output terminals 220 and 221, the decoder 194 has output terminals 222 and 223, and the decoder 195 has a single output terminal 224. These terminals are all connected to the dial pulsing chassis shown on FIG. 5 and the terminals are numbered in FIG. 5 to correspond to the terminals of FIG. 2 mentioned above. The cathodes connections from the decoders at terminals 215, 218, 220, 222, and 224 are connected to relays in the dial pulsing unit so that when the decoders respond, the relays are operated. These relays are numbered on FIG. 5 as 230, 231, 232, 233, and 234.

Figure 5:
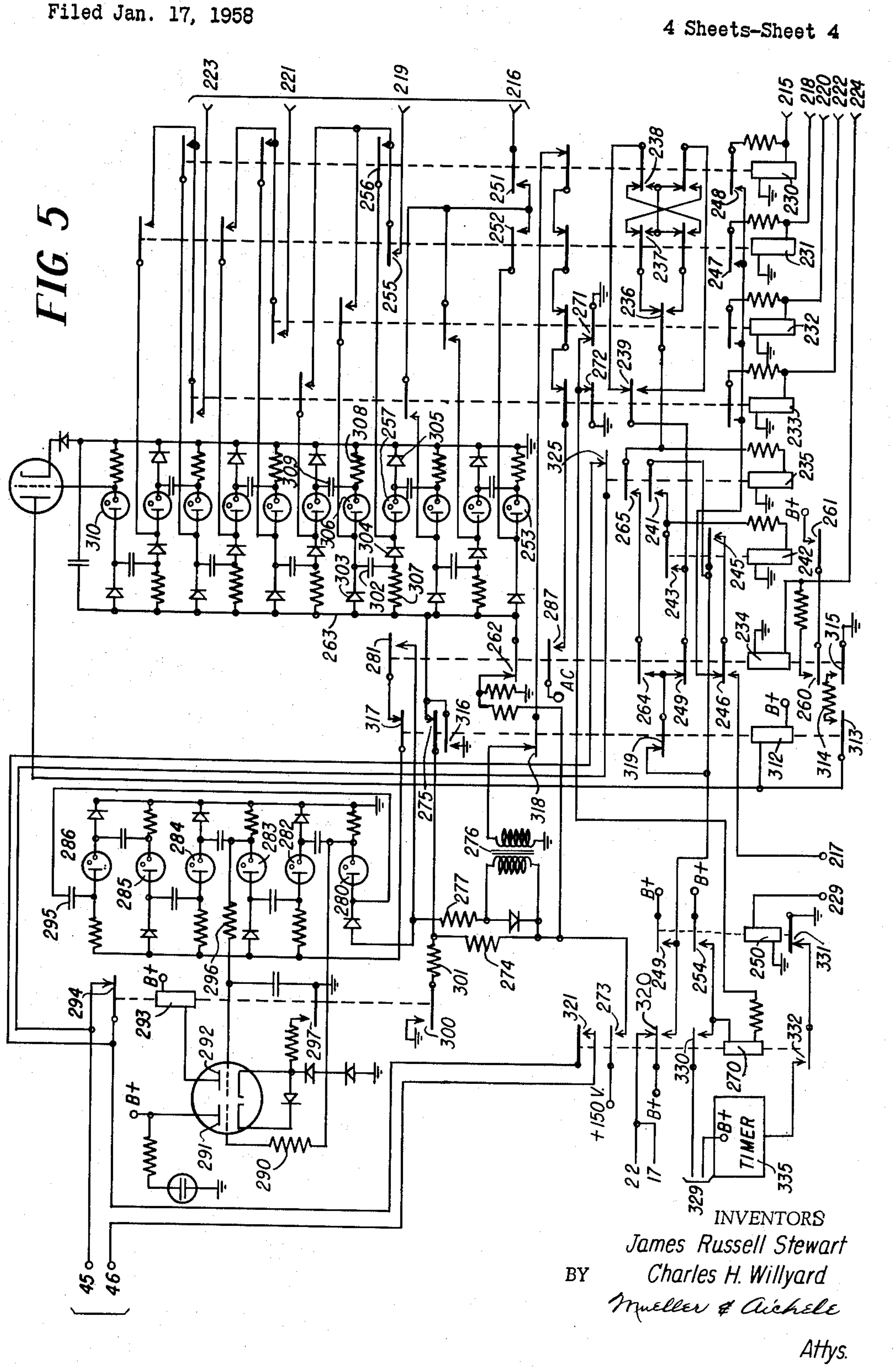
FIG. 5 is a circuit diagram of the dial pulsing circuit at the base station.

Referring now to FIG. 5, the dial pulsing chassis has a counting unit on the right side of the figure which includes the bank of neon bulbs including bulbs 253, 257, 306, and 310. The high voltages from the decoders selectively ignite the neon bulbs of the counting unit to set up the number dialled. This is accomplished through terminals 216, 219, 221, and 223 of the decoder which are connected to the correspondingly numbered terminals of the dial pulsing chassis. Terminals 215, 218, 220, 222, and 224 of the decoder are connected to relays 230, 231, 232, 233, and 234 to selectively energize these, as will be set forth.

The relays 230, 231, 232, and 233 have interconnected contacts so that when any two of thes relays are operated, the relay 25 will be energized. This circuit is completed when relays 230 and 231 are operated through closed contacts 236 of relay 232, contacts 237 of operated relay 231, contacts 238 of operated relay 230, closed contacts 239 of relay 233, closed contacts 240 of relay 234, and closed contacts 319 of relay 312. B+ is applied to the contacts 319 of relay 312, contacts 241 of relay 235, and contacts 245 of relay 242 through contacts 249 of squelch relay 250. The squelch relay is connected through terminal 229 to the squelch circuit of receiver 21 of FIG. 2, and is operated by the receiver since a carrier is being received. Squelch slave relay 270 is also energized through contacts 254 of squelch relay 250 and closed contacts 271 or 272 of relay 232 and 233 respectively. When the relay 235 is thereby energized, the contacts 241 of this relay energizes the slave relay 242, and the slave relay then locks in through its own contacts 243. Operation of relay 242 also locks up the energized tone relays 230 and 231 through contacts 245, contacts 246 of relay 234, and contacts 247 and 248 of the relays 231 and 230 respectively.

A timer 335 is energized through contacts 331 of the squelch relay 250 and contacts 332 of the squelch slave relay 270 of FIG. 5, so that the line closure to the exchange can be maintained throughout the normal push-to-talk operations of the remote mobile stations. This is accomplished by keeping the slave relay 270 locked in its operated position, through its contacts 330 and through contacts 328 of the transmitter control relay 325, for a preset time (approximately 2 to 3 minutes). The timing starts when the push-to-talk button is released in the mobile station and in turn the squelch relay 250 becomes deenergized. Thus, if the vehicle moves to an area outside the range of the base station, disconnect supervision in the form of removing the line closure is passed on to the exchange at the duration of the timing cycle.

In the example given above wherein the number 7 is first dialled, and this results in first transmitting the A tone and then the B tone, the decoders 191 and 192 will be energized in turn. The decoder 191 will provide a high voltage to the terminal 216 and will operate the relay 230. The high voltage applied at terminal 216 is applied through contacts 251 of relay 230, but is not further applied because none of the other relays 231, 232, or 233 is operated. This voltage disappears before the relay 231 operates to close contacts 252 which would apply the voltage to neon bulb 253. However, when the second tone B is received, and a high voltage is applied to terminal 219, relay 230 is operated as well as relay 231, so the voltage is applied through contacts 255 of relay 231 and then through contacts 256 of relay 230 to the neon bulb 257. This voltage is sufficient to ionize this bulb.

The third tone E is then applied which energizes the decoder 194 closing the circuit through terminal 224 to actuate relay 234. The relay 234 locks itself in through its own contacts 260 and contacts 261 of slave relay 242. The relay 235 is held operated through closed contacts 264 of relay 234 and 265 of the relay 235 itself. Contacts 246 of relay 234 open to release the relays 230 and 231 which have been held locked through this circuit.

A blocking voltage of B+ is applied through terminal 217 to the decoders 191, 192, 193, and 194 of FIG. 2 while the counter unit and pulser unit of FIG. 5 are operating. This is accomplished by contacts 245 of operated relay 242 and contacts 246 of operated relay 234 which apply B+ from contacts 320 of operated squelch slave relay 270 to terminal 217 or FIG. 5 and 217 on FIG. 2. The B+ voltage maintains each tube 208 in conduction thereby disabling the respective decoders.

Terminal 17 of FIG. 5 provides a blocking B+ voltage for the interdigit tone (E) decoder 195 of FIG. 2, when the squelch slave relay 270 is released. This feature is used in a revertive call between remote stations when the originating station depresses button 161 of FIG. 3 to transmit the disconnect tones C and D to the base station for the conventional disconnect supervision required by the exchange revertive calling circuit following the dialling of the called station. Although the interdigit tone E is transmitted upon release of button 161 in the same manner as the other buttons, the interdigit decoder is disabled as a result of the release of relay 270 from the operation of tone relays 232 and 233. Thereby, the interdigit tone relay 234 remains released and any false pulsing is eliminated.

Considering now the pulsing unit, this includes a second bank of neon bulbs including the bulbs 280, 282, 283, 284, 285, and 286. The 150 volts applied through contacts 273 of squelch slave relay 270 are applied through transformer 276 and resistor 277 to energize neon bulb 280. When the relay 234 is energized, contacts 281 close to connect the neon bulb 280 in the circuit of the remaining neon bulbs. Contacts 287 of relay 234 apply six volts A.C. to the transformer 276. Energization of neon bulb 280 applies a voltage through resistor 290 to the triode section 291. This renders the triode section 291 conducting and cuts off the triode section 292. The tube 292 energizes relay 293 which has contacts 294 connected across the line. When the tube 292 is cut off, the relay falls out so that contacts 294 are closed.

The transformer 276 applies pulses to the counting chain consisting of neon bulbs 280, 282, 283, 284, 285, and 286. These pulses cause first the bulb 280 to be extinguished, and the next bulb 282 to be ionized. The 60-cycle pulses from transformer 276 move up the chain causing each tube to be extinguished and the next one to be lit. The 60-cycle pulses from the transformer provide a timing operation which controls the pulsing relay 293.

After bulb 282 is ionized and extinguished, neon bulb 283 becomes ionized. This applies a voltage through resistor 296 to the triode section 292 which causes this triode section to conduct. This energizes relay 293 to open the contacts 294. The contacts 297 are closed to ground the cathode of the triode 292 so that relay 293 remains energized. The pulses from transformer 276 cause the neon bulbs to be ignited in series so that bulbs 284, 285, and 286 are energized in order to provide intervals of 1/60 of a second. Bulb 286 is connected through capacitor 298 to bulb 280 to cause this tube to conduct again. This applies a voltage through resistor 290 to the grid of triode 291 to cause this tube to conduct heavily and this draws the cathode to a sufficiently high voltage that tube 292 is cut off. This causes the relay 293 to be deenergized and the contacts 294 to close.

The contacts 294 of relay 293 are in series with the lines from the exchange and intermittently close these lines in the same manner as a normal dial at a substation. The terminals 45 and 46, to which contacts 294 are connected, are the inner terminals of the transformer windings 43 and 44 of FIG. 2 so that connecting these contacts bridges the lines 40 and 41. Accordingly, operation of the relay 293 through contacts 294 causes the normal dialling operation. Contacts 325 of relay 235 are in parallel with contacts 294 across the lines and normally hold the lines closed so that dial pulses cannot be applied to the line until relay 235 is operated.

The pulsing relay 293 also includes contacts 300 which cooperate with the counter-unit to pulse the number which has been set up on the counter-deck. In this respect, the counter unit also serves as a memory to hold the number until it has been applied through the pulsing unit to the line. The counter unit is energized from the 150 volts from contacts 273 of the squelch relay which is applied to the bus 263 of the counter through contacts 262 of relay 234 through a voltage divider and through resistor 274 and contacts 275 of relay 312. When relay 234 is operated, the contacts 262 open to remove the voltage divider so that sufficient voltage is applied to bus 263 to hold any bulb ignited in an ignited condition. When contacts 300 of relay 293 close, resistor 301 is connected in series with resistor 274 between the plus 150 volts and ground to reduce greatly the voltage applied through contacts 275 to the potential bus 263 of the counter. When this voltage is dropped, any tube which has been ignited is extinguished.

In the example previously stated, bulb 257 has been ignited. During the time when bulb 257 is conducting, the capacitor 302 charges through rectifiers 303, 304, and 305. The contacts 300 of relay 293 will be closed after the tube 283 of the pulser deck ignites and will remain closed until tube 280 is again ionized to cause the relay 293 to fall out and contacts 300 to open. When contacts 300 open, resistor 301 becomes disconnected to remove the voltage dividing effect, and the higher potential is applied to the bus 263. This is not enough in itself to cause any of the tubes to ignite, but the voltage stored in capacitor 302 will be added to the voltage on the bus 263 so that the next neon bulb 306 ionizes through the circuit including resistor 307, capacitor 302, bulb 306, and resistor 308. While this bulb conducts, capacitor 309 will charge so that when the bulb 306 is extinguished when relay 293 operates, the next neon bulb will be ignited when the relay falls out and the higher voltage is applied to the bus 263. Accordingly, the neon bulbs in the chain will operate, one following the other, with the interval therebetween being the interval of operation of the relay 293.

This interval between operations of relay 293 is controlled by the neon tubes of pulser unit and since the six neon tubes operate from the 60-cycle pulses, the interval is 1/60 of a second, and the relay 293 which operates after six pulses will operate at 1/10 of a second interval. This is the normal timing of dial pulses. Therefore, at 1/10 of a second, the neon tubes of the counter deck will operate one after the other until the tube 310 operates. This provides a positive voltage to the triode 311, the plate of which is connected to relay 312. This relay is called the digit stop relay and functions to stop the dialling pulses.

When the relay 312 operates, contacts 313 thereof close to provide a holding circuit for the relay 312 through resistor 314 and the contacts 315 of relay 234. The contacts 275 of relay 312 are opened so that the potential is removed from the bus 263 and this bus is grounded through contacts 316. Relay 312 opens contacts 317 to remove the potential from the pulsing deck. Contacts 318 of relay 312 open to remove the A.C. from the transformer 276 and contacts 319 open to remove the locking circuit for relay 235. This circuit was completed through contacts 264 of relay 234 and contacts 265 of relay 235.

Release of relay 235 opens contacts 241 thereof to remove the locking circuit for relay 242. Release of relay 242 opens contacts 261 to release relay 234, and release of relay 234 opens contact 315 to release the holding circuit for relay 312. Accordingly, all relays are now deenergized so that the equipment is in condition for receiving the next digit. Additional digits in the number being dialled will cause the decoder to produce voltages which will provide the same operations, with the relay 293 operating to break the connection between the lines to provide pulses thereon. It will be apparent that as lower numbers are dialled, the tubes of the counter along the chain nearer the final tube are ignited by the voltages from the decorder so that fewer pulses are produced.

As previously stated, when the mobile unit is through with a conversation and the hand set is placed on the hook switch, tones C and D will be applied. The decoder will produce connections which energize relays 232 and 233 to open contacts 271 and 272 thereof. These two contacts form a holding circuit for the squelch slave relay 270 and when both of these relays are operated, the squelch relay will drop out. This completely deenergizes the system as contacts 273 and 320 are opened. This also opens contacts 321 to break the series circuit to the contacts 294 so that dialling operations cannot take place.

Terminal 22 of FIG. 5 provides the B+ voltage for the ringing tone tubes 56 and 68 of FIG. 2 through terminal 22 and relays 57 and 58 of FIG. 2. This B+ voltage is present only when the system is idle or in a ringing-out-to-remote-stations condition. Otherwise, operation of the squelch slave relay 270 removes the B+ by its contacts 320.

The base station transmitter 20 of FIGS. 1 and 2 is controlled by the exchange 16 through a control relay 325 (FIG. 2) connected to the exchange by line 326. The relay is connected to the line circuit in the exchange such that each time the line is seized by either a land telephone 17, or by a remote station 11 or 12 through a line closure, the relay operates and turns on the transmitter through contacts 327. The control relay also includes contacts 328 coupled by line 329 to the timer in the circuit providing B+ voltage to the locking contacts 330 of squelch slave relay 270 of FIG. 5.

The invention, therefore, provides a system for coupling a remote station to an automatic telephone exchange through a radio link and which provides automatic operation between the remote stations and the exchange. Therefore, the mobile operator generally used is not required. The equipment provided is relatively simple compared to prior equipment used for similar purposes. The equipment makes it possible to dial from the remote stations to any station in the telephone exchange and also permits dialling from one remote station to another remote station through the revertive calling equipment provided in the exchange. A plurality of remote stations can be provided operating as a party line and using a single frequency for the radio equipment. These individual stations, however, are individually called and stations not involved in any call will be locked out so that the communication will be private.

We claim:

1. A telephone system for providing automatic operation between a dial telephone exchange and remote radio-connected stations, and in which the exchange responds to dial pulses to connect the remote stations to selected stations, said system including in combination, apparatus at each remote station including radio transmitting and receiving means, means producing four tones of different frequencies, and push-button selecting means which selects two of said tones for each digit of a called number and applies the same in a predetermined order to the radio transmitting means, and apparatus at the exchange including radio transmitting and receiving means, decoding means producing control voltages in response to the tones received, memory means including a first bank of neon bulbs responsive to said control voltage for registering a digit, relay means responsive to said control voltages for controlling said memory means, and means including a second bank of neon bulbs responsive to said memory means for producing telephone dial pulses corresponding to the digit registered.

2. A telephone system for providing automatic operation between a dial telephone exchange and remote radio-connected stations, and in which the exchange responds to dial pulses to connect the remote stations to selected stations, said system including in combination, apparatus at each remote station including radio transmitting and receiving means, means producing four tones of different frequencies, and push-button selecting means which selects two of said tones for each digit of a called number and applies the same in a predetermined order to the radio transmitting means, and apparatus at the exchange including radio transmitting and receiving means, and means producing telephone dial pulses in response to the tones received and having means including a first bank of neon bulbs for registering a digit represented by the received tones and having means including a second bank of six neon bulbs for producing dial pulses corresponding to the digit registered, said last named means applying pulses to said neon bulbs of said second bank at an interval of one sixtieth of a second so that dial pulses are produced at an interval of one tenth of a second.

3. A telephone system for providing automatic operation between a dial telephone exchange and remote radio-connected stations, and in which the exchange responds to dial pulses to connect the remote stations to selected stations, said system including in combination, apparatus at each remote station including radio transmitting and receiving means, means producing five tones of different frequencies, push-button selecting means for selecting two out of four of the tones for each digit of a called number, and means for applying the selected tones in a predetermined order to the radio transmitting means and for applying thereafter the fifth tone, and apparatus at the exchange including radio transmitting and receiving means, means producing control voltages in response to the tones received, memory means including a first bank of neon bulbs for registering a digit represented by the received tones, relay means responsive to said control voltages for selectively applying said control voltages to said memory means, and pulsing means including a second bank of neon bulbs for producing telephone dial pulses corresponding to the digit registered, said relay means initiating operation of said pulsing means in response to the control voltage produced by said fifth tone, said memory means being coupled to said pulsing means to control the number of pulses produced.

4. A telephone system for providing automatic operation between a dial telephone exchange and remote radio-connected stations, and in which the exchange selectively applies intermittent ringing signals on first and second lines for selecting individual remote stations and responds to dial pulses from remote stations to connect the remote stations to selected stations, said system including in combination, first apparatus at the exchange including radio transmitting and receiving means, means providing first and second signal waves of different frequencies, means for selecting a particular signal wave in response to a ringing signal on one of the lines and modulating the selected signal wave by such ringing signal, and means applying the modulated signal wave to said radio transmitting means in an intermittent manner corresponding to the intermittent ringing signal; and second apparatus at each remote station including radio transmitting and receiving means, and means responsive to a particular received signal wave and producing an intermittent ringing indication.

5. A telephone system for providing automatic operation between a dial telephone exchange and remote radio-connected stations, and in which the exchange selectively applies intermittent ringing signals on first and second lines for selecting individual remote stations and responds to dial pulses from remote stations to connect the remote stations to selected stations, said system including in combination, first apparatus at the exchange including radio transmitting and receiving means, means providing first and second signal waves of different frequencies, means for selecting a particular signal wave in response to a ringing signal on one of the lines and modulating the selected signal wave by such ringing signal, and means applying the modulated signal wave to said radio transmitting means in an intermittent manner corresponding to the intermittent ringing signal; and second apparatus at each remote station including radio transmitting and receiving means, means responsive to a particular received signal wave and producing an intermittent ringing indication, and means operative when said second apparatus is in use for disabling said signal wave selecting applying means of said first apparatus.

6. A telephone system for providing automatic operation between a dial telephone exchange and remote radio-connected stations, and in which the exchange responds to dial pulses to connect the remote stations to selected stations, said system including in combination, apparatus at each remote station including radio transmitting and receiving means, means producing five tones of different frequencies, pushbutton selecting means for selecting two out of four of the tones for each digit of a called number, means for applying the selected tones in a predetermined order to the radio transmitting means and for applying thereafter the fifth tone, and means operating in response to completion of a call from the remote station for transmitting two of said four tones in a predetermined order in a different combination than that used for any digit, and apparatus at the exchange including radio transmitting and receiving means, means producing control voltages in response to the tones received, memory means for registering a digit represented by the received tones, relay means responsive to said control voltages and selectively applying said control voltages to said memory means, and pulsing means for producing telephone dial pulses corresponding to the digit registered, said relay means initiating operation of said pulsing means in response to the control voltage produced by said fifth tone, with said memory means controlling the number of pulses produced, said relay means operating in response to control voltages produced by said different combination of tones at the completion of a call to provide disconnect operation at the exchange.

7. A telephone system for providing automatic operation between a dial telephone exchange and remote radio-connected stations, and in which the exchange responds to dial pulses to connect the remote stations to selected stations, said system including in combination, apparatus at each remote station including radio transmitting and receiving means, means producing five tones of different frequencies, selecting means including eleven pushbuttons each of which selects two out of four of the tones in a predetermined order with each button providing a different combination of tones, ten of said push-buttons providing combinations of two tones corresponding to the numbers of a digit and the eleventh push-button providing a particular combination of tones for disconnect operation, means for applying the selected tones in a predetermined order to the radio transmitting means and for applying thereafter the fifth tone, and means operating in response to completion of a call from the remote station for transmitting said particular combination of tones, and apparatus at the exchange including radio transmitting and receiving means, means producing control voltages in response to the tones received, memory means including a first bank of neon bulbs for registering a digit represented by the received tones, relay means responsive to said control voltages and selectively applying said control voltages to said memory means, and pulsing means including a second bank of neon bulbs for producing pulses corresponding to the digit registered, said relay means initiating operation of said pulsing means in response to the control voltage produced by said fifth tone, with said memory means controlling the number of pulses produced, said relay means operating in response to control voltages produced by said particular combination of tones to provide disconnect operation at the exchange.

8. A telephone system for providing automatic operation between a dial telephone exchange and remote radio-connected stations, and in which the exchange applies ringing signals for calling individual remote stations and responds to dial pulses from remote stations to connect the remote stations to selected stations, said system including in combination, first apparatus at the exchange including radio transmitting and receiving means, means providing a plurality of signal waves of different frequencies, means selecting a particular signal wave in response to a particular ringing signal from the exchange and modulating the selected signal wave by such ringing signal, and means applying the modulated signal wave to said radio transmitting means; and second apparatus at each remote station including radio transmitting and receiving means, indicating means responsive to a particular received signal wave, means producing four tone signals of different frequencies, and selecting means operating to select two of said tone signals for each digit of a called number and to apply the same to the radio transmitting means; said first apparatus including means for receiving said tone signals, and means producing dial pulses in response to the tone signals received and having first means for registering a digit represented by the received tone signal frequencies and second means for producing pulses corresponding to the digit registered.

9. A telephone system for providing automatic operation between a dial telephone exchange and remote radio-connected stations, and in which the exchange applies ringing signals for calling individual remote stations and responds to dial pulses from remote stations to connect the remote stations to selected stations, said system including in combination; first apparatus at the exchange including radio transmitting and receiving means, means providing a plurality of signal waves of different frequencies, means selecting a particular signal wave in response to a particular ringing signal from the exchange and modulating the selected signal wave by such ringing signal, and means applying the modulated signal wave to said radio transmitting means; and second apparatus at each remote station including radio transmitting and receiving means, indicating means responsive to a particular signal wave received, means producing a plurality of tone signals of different frequencies, and selecting means which selects predetermined tone signals for different digits of a called number and applies the same to said radio transmitting means; said first apparatus including means producing dial pulses in response to received tone signals.

10. A telephone system for providing automatic operation between a dial telephone exchange and remote radio-connected stations, and in which the exchange applies ringing signals for calling individual remote stations and responds to dial pulses from remote stations to connect the remote stations to selected stations, said system including in combination, first apparatus at the exchange including radio transmitting and receiving means, means providing a plurality of signal waves of different frequencies, means selecting a particular signal wave in response to a particular ringing signal from the exchange and modulating said selected signal wave by such ringing signal, and means applying the modulated signal wave to said radio transmitting means; and second apparatus at each remote station including radio transmitting and receiving means, indicating means responsive to a particular received signal wave, means producing four tone signals of different frequencies, and push-button selecting means operative to select two of said tone signals for each digit of a called number and to apply the same in a predetermined order to the radio transmitting means; said first apparatus including means producing dial pulses in response to said received tone signals and having means including a first bank of neon bulbs for registering a digit represented by said received tone signals and having means including a second bank of neon bulbs for producing pulses corresponding to the digit registered.

11. A telephone system for providing automatic operation between a dial telephone exchange and remote radio-connected stations, and in which the exchange applies ringing signals for calling individual remote stations and responds to dial pulses from remote stations to connect the remote stations to selected stations, said system including in combination, first apparatus at the exchange including radio transmitting and receiving means, means providing a plurality of signal waves of different frequencies, means selecting a particular signal wave in response to a particular ringing signal from the exchange and modulating said selected signal wave by such ringing signal, and means applying the modulated signal wave to said radio transmitting means; and second apparatus at each remote station including radio transmitting and receiving means, indicating means responsive to a particular received signal wave, means producing four tone signals of different frequencies, and push-button selecting means which selects two of said tone signals for each digit of a called number and applies the same in a predetermined order to the radio transmitting means; said first apparatus including decoding means producing control voltages in response to the tone signal frequencies received, memory means responsive to said control voltages for registering a digit, relay means responsive to said control voltages for controlling said memory means, and means responsive to said memory means for producing telephone dial pulses corresponding to the digit registered.

12. A telephone system for providing automatic operation between a dial telephone exchange and remote radio-connected stations, and in which the exchange applies ringing signals for calling individual remote stations and responds to dial pulses from remote stations to connect the remote stations to selected stations, said system including in combination; first apparatus at the exchange including radio transmitting and receiving means, means providing a plurality of signal waves of different frequencies, means selecting a particular signal wave in response to a particular ringing signal from the exchange and modulating the selected signal wave by such ringing signal, and means applying the modulated signal wave to said radio transmitting means; and second apparatus at each remote station including radio transmitting and receiving means, indicating means responsive to a particular signal wave received, means producing a plurality of tone signals of different frequencies, and selecting means which selects predetermined tone signals for different digits of a called number and applies the same to said radio transmitting means; said first apparatus including means producing dial pulses in response to received tone signals, and interlocking means for disabling said means for selecting a particular signal wave in response to reception of signals by said receiving means of said first apparatus to prevent the transmission of such signal wave when signals are received at the exchange.

References Cited in the file of this patent

UNITED STATES PATENTS

| | | |
|---|---|---|
| 2,523,315 | Mayle | Sept. 26, 1950 |
| 2,547,024 | Noble | Apr. 3, 1951 |
| 2,580,095 | Holden | Dec. 25, 1951 |
| 2,655,652 | Homrighous | Oct. 13, 1953 |
| 2,744,965 | Molnar | May 8, 1956 |
| 2,843,675 | Collins | July 15, 1958 |